United States Patent
Condit et al.

(10) Patent No.: US 9,264,835 B2
(45) Date of Patent: Feb. 16, 2016

(54) EXPOSING OFF-HOST AUDIO PROCESSING CAPABILITIES

(75) Inventors: Kristin Condit, Redmond, WA (US); Adeel Aslam, Kirkland, WA (US); Cheng-mean Liu, Redmond, WA (US); Catherine Werner, Kirkland, WA (US); Nicholas J. Benson, Bothell, WA (US); Frank Yerrace, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 13/053,070

(22) Filed: Mar. 21, 2011

(65) Prior Publication Data

US 2012/0245718 A1    Sep. 27, 2012

(51) Int. Cl.
*G06F 17/00* (2006.01)
*H04S 7/00* (2006.01)
*G06F 3/16* (2006.01)
*H04R 3/00* (2006.01)
*H04R 27/00* (2006.01)

(52) U.S. Cl.
CPC . *H04S 7/00* (2013.01); *G06F 3/165* (2013.01); *G06F 3/16* (2013.01); *G06F 3/162* (2013.01); *H04R 3/00* (2013.01); *H04R 27/00* (2013.01); *H04R 2227/003* (2013.01); *H04R 2430/01* (2013.01)

(58) Field of Classification Search
None
See application file for complete search history.

(56) References Cited

U.S. PATENT DOCUMENTS

| | | | |
|---|---|---|---|
| 7,006,975 B1 | 2/2006 | Dodrill et al. | |
| 7,437,547 B2 | 10/2008 | Hyder et al. | |
| 7,647,203 B1 | 1/2010 | Herz | |
| 2002/0150082 A1 | 10/2002 | Celi, Jr. | |
| 2003/0236813 A1 | 12/2003 | Abjanic | |
| 2004/0064210 A1* | 4/2004 | Puryear et al. | 700/94 |
| 2007/0266168 A1* | 11/2007 | Sampat et al. | 709/231 |

(Continued)

FOREIGN PATENT DOCUMENTS

| | | |
|---|---|---|
| CN | 1533137 | 9/2004 |
| CN | 101488080 | 7/2009 |

OTHER PUBLICATIONS

Audio Processing Unit (APU), downloaded from http://www.nvidia.com/object/apu.html, 2 pages (document copyright dated 2010, downloaded on Jan. 3, 2011).

(Continued)

*Primary Examiner* — Fan Tsang
*Assistant Examiner* — David Siegel
(74) *Attorney, Agent, or Firm* — Sunah Lee; Judy Yee; Micky Minhas

(57) ABSTRACT

An off-host audio engine interface exposes audio processing capabilities to a host. The interface receives offloaded audio streams and a host-processed audio stream from the host. The off-host audio engine processes the offloaded audio streams individually to create off-host-processed audio streams. The host-processed audio stream is mixed with the off-host-processed streams to create a mixed stream. The mixed stream undergoes audio processing by the off-host engine. The off-host audio engine provides output and reference audio streams based on the mixed audio stream. The reference stream can be provided to the host via the interface. Via the interface, the host can control local and global audio processing performed by the off-host engine by enabling or disabling local and global processing, and by enabling or disabling local and global audio processing components of the off-host audio engine.

20 Claims, 8 Drawing Sheets

(56) References Cited

U.S. PATENT DOCUMENTS

2009/0204413 A1* 8/2009 Sintes ................ G10L 19/16
704/500
2010/0094982 A1 4/2010 Budhia et al.

OTHER PUBLICATIONS

Hardware-Accelerated Video Decode on the Intel® Atom™ Procession with the Intel® System Controller Hub US15W chipset Platform, downloaded from edc.intel.com/Download.aspx?id=2578 &returnurl=/default.aspx, 20 pages (document dated Aug. 2009, downloaded on Jan. 3, 2011).

Technical Brief, NVIDIA nForce MCP Audio Processing Unit, 10 pages (document copyright dated 2001, downloaded on Jan. 21, 2011).

SignalLogic® DirectDSP®, downloaded from http://www.signalogic.com/index.pl?page=directDSP, 4 pages (web page copyright dated 1995-2011, downloaded on Mar. 16, 2011).

First Office Action and Search Report Issued in Chinese Patent Application No. 201210075526.7, dated Dec. 2, 2015, 11 Pages (w/o English Translation).

* cited by examiner

EXPOSING OFF-HOST AUDIO PROCESSING CAPABILITIES

BACKGROUND

Audio processing can be very computationally intensive. In many scenarios, it can be beneficial to allow audio processing, such as mixing, decoding and applying effects, to be performed by hardware separate from the main central processing unit (CPU) of a computing device.

SUMMARY

This Summary is provided to introduce a selection of concepts, in a simplified form, that are further described in the Detailed Description. This Summary is not intended to identify key features or essential features of the claimed subject matter, nor is it intended to be used as an aid in determining the scope of the claimed subject matter.

The tools and techniques described herein provide a way to expose audio processing capabilities of an off-host audio engine to a host. Off-host audio engine processing capabilities include audio mixing, decoding, applying effects on a per-stream and per-device basis, audio encoding, volume control and metering support. Once these capabilities are exposed, an application is able to send audio streams to the off-host audio engine, enabling the application to utilize the off-host audio processing capabilities.

In one embodiment, an off-host audio engine interface receives multiple audio streams that have not been processed by a host (offloaded streams) and an audio stream that has been processed by the host (a host-processed stream). The off-host audio engine, typically a hardware digital signal processor (DSP), processes the offloaded streams individually and mixes the resulting processed streams with the host-processed stream. The off-host audio engine provides a reference audio stream back to the host via the interface, and provides an output audio stream to a set of speakers or other endpoint.

In some embodiments, the host can control the audio processing performed by the off-host audio engine via the off-host audio engine interface. For example, the host can disable or enable the processing performed on individual offloaded streams, and can disable or enable various individual audio processing components of the off-host engine.

In some embodiments, the host determines which streams are to be offloaded to the off-host engine by determining whether the off-host engine is capable of accepting an additional stream for processing, or based on a characteristics of the audio stream, such as whether the audio stream is a complex data stream, has a high bit rate or is to undergo a high level of audio processing.

The foregoing and other objects, features and advantages of the invention will become more apparent from the following Detailed Description, which proceeds with reference to the accompanying figures.

DETAILED DESCRIPTION

Audio processing on a host central processing unit (CPU) can be computationally intensive, resulting in high power consumption, a higher probability of audio glitching, and, in the case mobile devices, low battery life. Offloading audio processing from the host to a digital signal processor (DSP) or other dedicated hardware is one approach to solving this problem. As a result, some embodiments provide a standard way to expose the audio processing capabilities of an off-host audio engine to a host.

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

Figure 1:
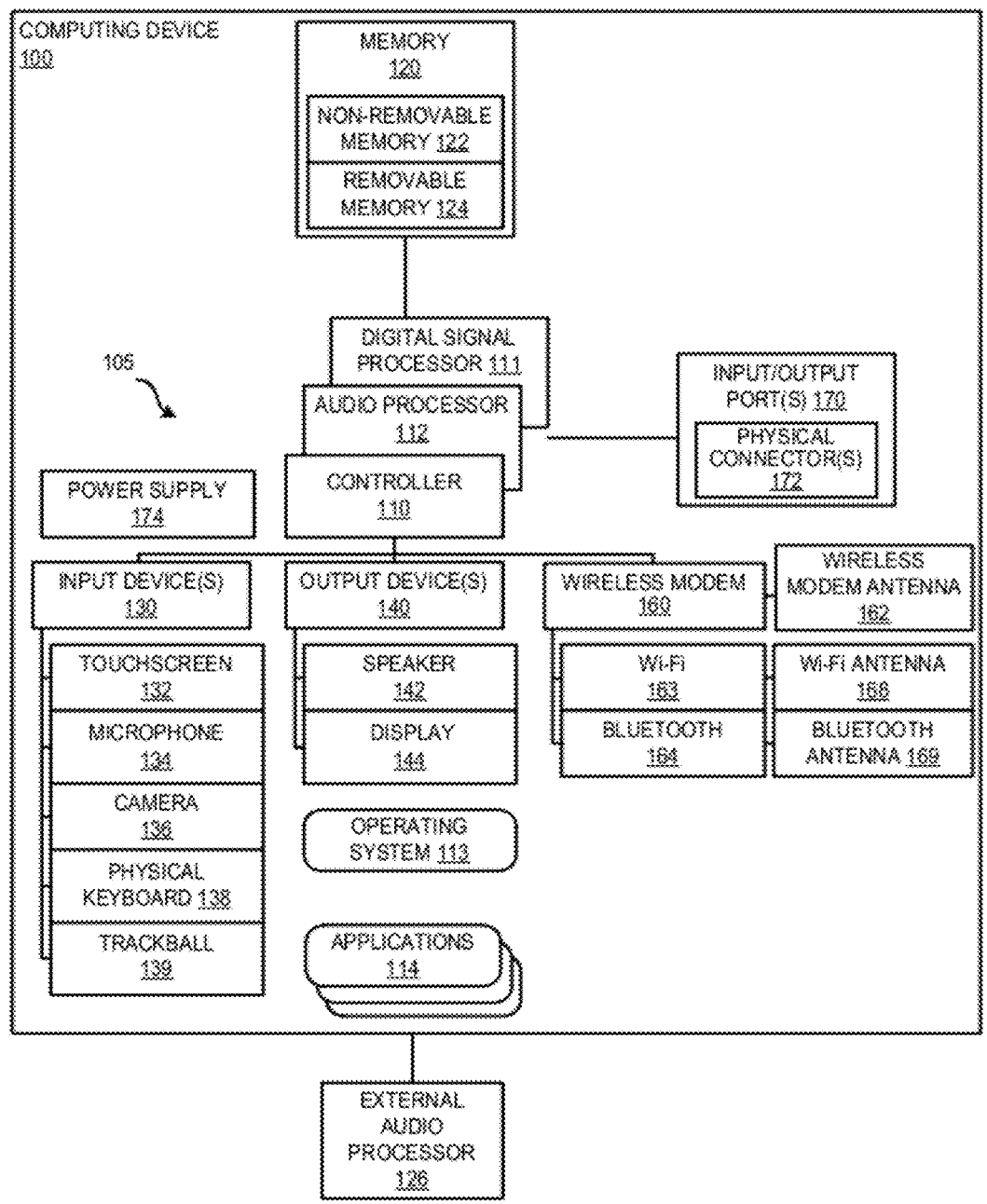
FIG. 1 is a block diagram depicting an exemplary computing device.

FIG. 1 is a block diagram depicting an exemplary computing device 100 that can be used to perform any of the methods described herein. The computing device 100 can include a variety of optional hardware and software components 105. Generally, components 105 can communicate with other components, although not all connections are shown, for ease of illustration. The computing device 100 can be any of a variety of computing devices including servers; desktop, laptop, netbook and tablet computers; cell phones; smartphones; personal digital assistants (PDAs) and other mobile devices; and other types of computing devices that can have audio processing capabilities such as televisions and media players.

The illustrated computing device 100 can include one or more controllers 110 such as a central processing unit (CPU), digital signal processor (DSP) 111, audio processor 112, graphics processing unit (GPUs), microprocessor, ASIC, or other control and processing logic circuitry or software for performing such tasks as signal coding, graphics processing, audio processing, data processing, input/output processing, power control, and/or other functions. An operating system 113 can control the allocation and usage of the components 105 and support for one or more application programs 114. The application programs can include common mobile computing applications (e.g., email applications, calendars, contact managers, web browsers, messaging applications), or any other computing application.

The illustrated computing device 100 can include memory 120. Memory 120 can include non-removable memory 122 and removable memory 124. The non-removable, or embedded memory, 122 can include RAM, ROM, flash memory, a hard drive, or other well-known memory storage technologies. The removable memory 124 can include flash memory cards, memory sticks or other well-known memory storage technologies, such as "smart cards." The memory 120 can be used for storing data and/or computer-executable instructions for running the operating system 113 and the application programs 114. Example data can include web pages, text, images, sound files, media data or other data sets. The computing device 100 can have access to an external audio processor 126, which can comprise, for example, an audio processor of another computing device in communication with the computing device 100.

The computing device 100 can support one or more input devices 130, such as a touch screen 132, microphone 134, camera 136, physical keyboard 138 and/or trackball 139 and one or more output devices 140, such as a speaker 142, and a display 144. Other possible output devices (not shown) can include piezoelectric or other haptic output devices. Any of the input devices 130 and output devices 140 can be internal to, external to, or removably attachable with the computing device 100. External input and output devices 130 and 140 can communicate with the computing device 100 via a wired or wireless connection. Some devices can serve more than one input/output function. For example, touchscreen 132 and display 144 can be combined in a single input/output device.

A wireless modem 160 can be coupled to a wireless modem antenna 162 and can support two-way communications between the computing device 100 and external devices, as is well understood in the art. The modem 160 and the antenna 162 are shown generically and can be a wireless cellular modem for communicating with a mobile cellular communication network. The wireless modem 160 can comprise other radio-based modems such as a Wi-Fi modem 163 or a Bluetooth modem 164, each of which can be coupled to its own antenna (e.g., Wi-Fi antenna 168, Bluetooth antenna 169). The wireless modem 160 is typically configured for communication with one or more cellular networks, such as a GSM network for data and voice communications within a single cellular network, between cellular networks, or between the computing device and a public switched telephone network (PSTN).

The computing device 100 can further include at least one input/output port 170 (which can be, for example, a USB port, IEEE 1394 (FireWire) port, and/or RS-232 port) comprising physical connectors 172, a power supply 174. The illustrated components 105 are not required or all-inclusive, as any components can be deleted and other components can be added.

Figure 2:
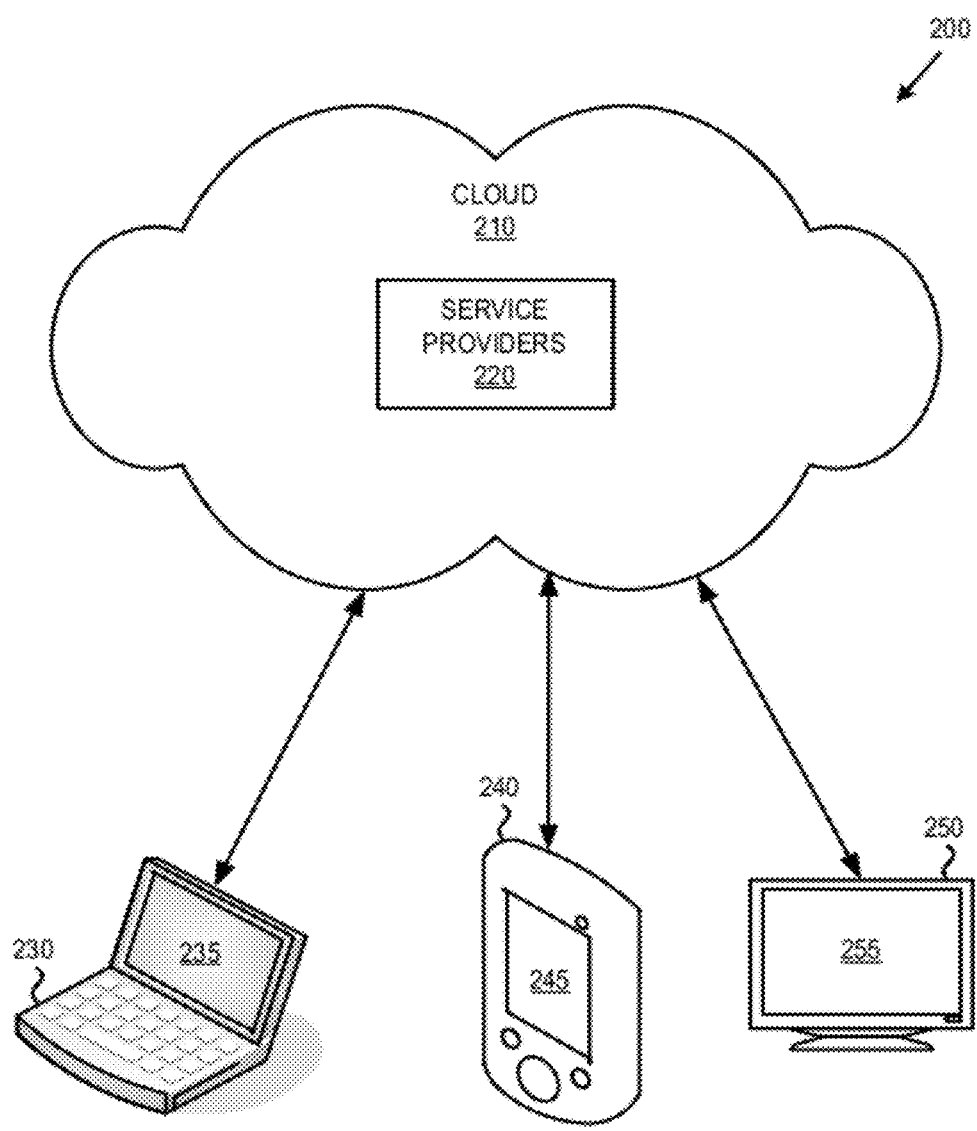
FIG. 2 illustrates a generalized example of a suitable implementation environment in which described embodiments, techniques, and technologies can be implemented.

FIG. 2 illustrates a generalized example of a suitable implementation environment 200 in which described embodiments, techniques, and technologies can be implemented.

In example environment 200, various types of services (e.g., computing services) are provided by a cloud 210. For example, the cloud 210 can comprise a collection of computing devices, which can be located centrally or distributed, that provide cloud-based services to various types of users and devices connected via a network such as the Internet. The implementation environment 200 can be used in different ways to accomplish computing tasks. For example, some tasks (e.g., processing user input and presenting a user interface) can be performed on local computing devices (e.g., connected devices 230, 240, 250) while other tasks (e.g., storage of data to be used in subsequent processing) can be performed in the cloud 210.

In example environment 200, the cloud 210 provides services for connected devices 230, 240, 250 with a variety of screen capabilities. Connected device 230 represents a device with a computer screen (e.g., a mid-size screen 235). For example, connected device 230 could be a desktop, laptop, notebook, netbook or tablet computer or the like. Connected device 240 represents a computing device with a computing device screen 245 (e.g., a small-size screen). For example, connected device 240 could be a mobile phone, smart phone, personal digital assistant or the like. Connected device 250 represents a device with a large screen 255. For example, connected device 250 could be a television with Internet connectivity, or a television connected to another device capable of connecting to the cloud such as a set-top box, gaming console or the like. One or more of the connected devices 230, 240, 250 can include touch screen capabilities. Devices without screen capabilities also can be used in example environment 200. For example, the cloud 210 can provide services for one or more computers (e.g., server computers) without displays.

Services can be provided by the cloud 210 through service providers 220, or through other providers of online services (not depicted). For example, cloud services can be customized to the screen size, display capability, and/or touch screen capability of a particular connected device (e.g., connected devices 230, 240, 250). Services that can be provided by the service providers 220 include, for example, email, Short Message Service (SMS), Multimedia Message Service (MMS), social networking and website hosting. Off-host audio processing can be provided by cloud-based services as well. The service providers can host online marketplaces offering wide varieties of goods and services such as software applications, including audio processing applications, and upgrades and streaming media content which can be obtained by users with or without purchase and for download from the cloud or delivery through postal mail.

In example environment 200, the cloud 210 provides the technologies and solutions described herein to the various connected devices 230, 240, 250 using, at least in part, the service providers 220. For example, the service providers 220 can provide a centralized solution for various cloud-based services. The service providers 220 can manage service subscriptions for users and devices (e.g., for the connected devices 230, 240, 250 and their respective users).

Figure 3:
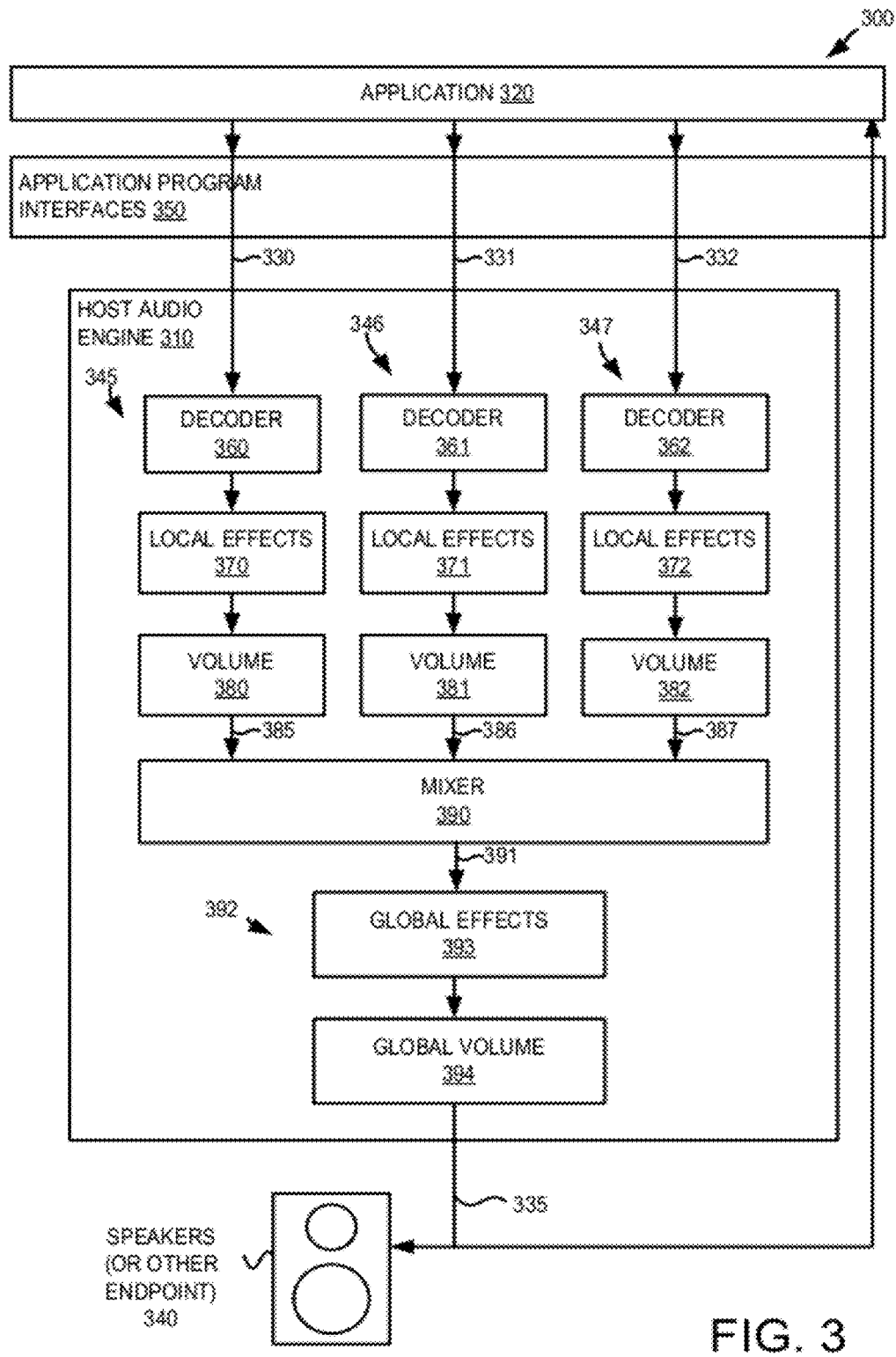
FIG. 3 is a block diagram of an exemplary audio processing system comprising a host audio engine.

FIG. 3 is a block diagram of an exemplary audio processing system 300 comprising a host audio engine 310. An application 320 utilizes the audio processing capabilities of a host audio engine 310 to process audio streams 330-332. The host audio engine 310 generates an output stream 335 for delivery to an endpoint 340 such as a set of speakers or other component. The application 320 interfaces with the host audio engine 310 via one or more application program interfaces (APIs) 350.

As used herein, the term "host" generally refers to the CPU, which can comprise one or more physical components, of a computing device. A "host audio engine" is a host (or portion of a host) that is configured to perform audio processing. A host audio engine can be a hardware audio engine that processes audio via dedicated audio processing hardware, or a software audio engine comprising a host coupled with instructions that cause the host to perform audio processing. Such instructions can be part of a software application or a portion of an operating system, or firmware instructions. The host audio engine 310, the application 320 and the APIs 350 can be part of a host.

Accordingly, an "off-host audio engine" refers to a component separate from the host and that has audio processing capabilities. The off-host audio engine can be a hardware component or a hardware component that executes software or firmware instructions to perform audio processing. Generally, the off-host audio engine is located within the same computing device as the host, but can be located external to a host-containing computing device. In embodiments where the off-host audio engine is external to a host-containing computing device, the term "host" can refer to the host-containing computing device as a whole.

The application 320 comprises any application capable of generating audio streams 330-332 for audio processing. The audio streams 330-332 can comprise audio data encoded in any audio encoding formats known in the art. The audio streams 330-332 can comprise streaming audio data that is continually delivered from the application 320 to the endpoint 340. Such streaming audio data can be, for example, audio data received by a web browser application from an Internet radio website. The audio streams 330-332 can also comprise audio data that does not originate from a streaming audio source.

The application 320 communicates with the host engine 310 via one or more APIs 350. The APIs 350 can comprise both higher-level and lower-level APIs. For example, in a computing device running the Windows® operating system, the APIs 350 can comprise a Windows® Audio Session API (WASAPI) that can receive audio streams from a higher-level API such as Direct Sound, WAVE or Media Foundation.

The host audio engine 310 comprises local audio processing pipelines 345-347 for processing the individual audio streams 330-332. Although three local audio processing pipelines are shown, any audio engine described herein can include more or fewer local processing pipelines. The local pipelines 345-347 comprise decoder 360-362, local audio effects 370-372 and volume 380-382 components to generate off-host-processed streams 385-387. Decoder components 360-362, local effects components 370-372 and volume components 380-382 decode, apply various audio effects (e.g., echo, pitch shift) and adjust the volume of the audio signals represented in the individual audio streams 330-332. The off-host-processed streams 385-387 are mixed by the mixer 390, and the resulting mixed stream 391 is processed by a global audio processing pipeline 392. The global processing pipeline 392 comprises global audio effects 393 and global volume 394 components to apply sound effects and adjust the volume of the mixed signal. The resulting output audio stream 335 is sent to the speakers or other endpoint 340.

The output audio stream 335 can also be sent back to the application 320 for use as a reference audio stream. For example, the output audio stream 335 can be provided to the application 320 through the APIs 350. Providing the output audio stream 335 as a reference stream is useful for applications and scenarios that rely on, for example, acoustic echo cancellation, which typically requires knowledge of the final output stream to cancel echoes and prevent feedback.

Although the output audio stream 335 is shown as a reference audio stream in FIG. 3, other streams within the host audio engine 310 pipeline could be provided as a reference stream. For example, the mixed audio stream 391 or the output of the global effects component 393 can be provided as the reference stream. In some embodiments, the output audio stream can be provided as a reference signal if the output of the final audio engine component provides the audio output in pulse code modulation (PCM) format. Otherwise, a post-mixing but pre-encoded audio stream such as mixed audio stream 391 or the output of the global effects components 393 can be provided as the reference stream.

In other embodiments, the host audio engine 310 can contain more or fewer audio processing components than those shown in FIG. 3. For example, the global audio processing pipeline can further include an encoder component, or the global audio processing pipeline 392 can be non-existent (i.e., the mixed audio stream 391 is provided as the output stream 335). Further, it is not necessary that the audio processing pipelines be identical. For example, in some embodiments, one of the local processing pipelines could exclude a volume component or have a local effects component capable of applying more or fewer sound effects than local effects components of other local pipelines.

The various audio process components can be selectively enabled and controlled by the application 320 via the APIs 350. For example, any of the volume components 380-382 can be enabled such that volume is adjusted only on selected offloaded audio streams. Similarly, the local effects components 370-372 and the global effects component 393 can be controlled such that only selected local and global audio effects are applied.

Figure 4:
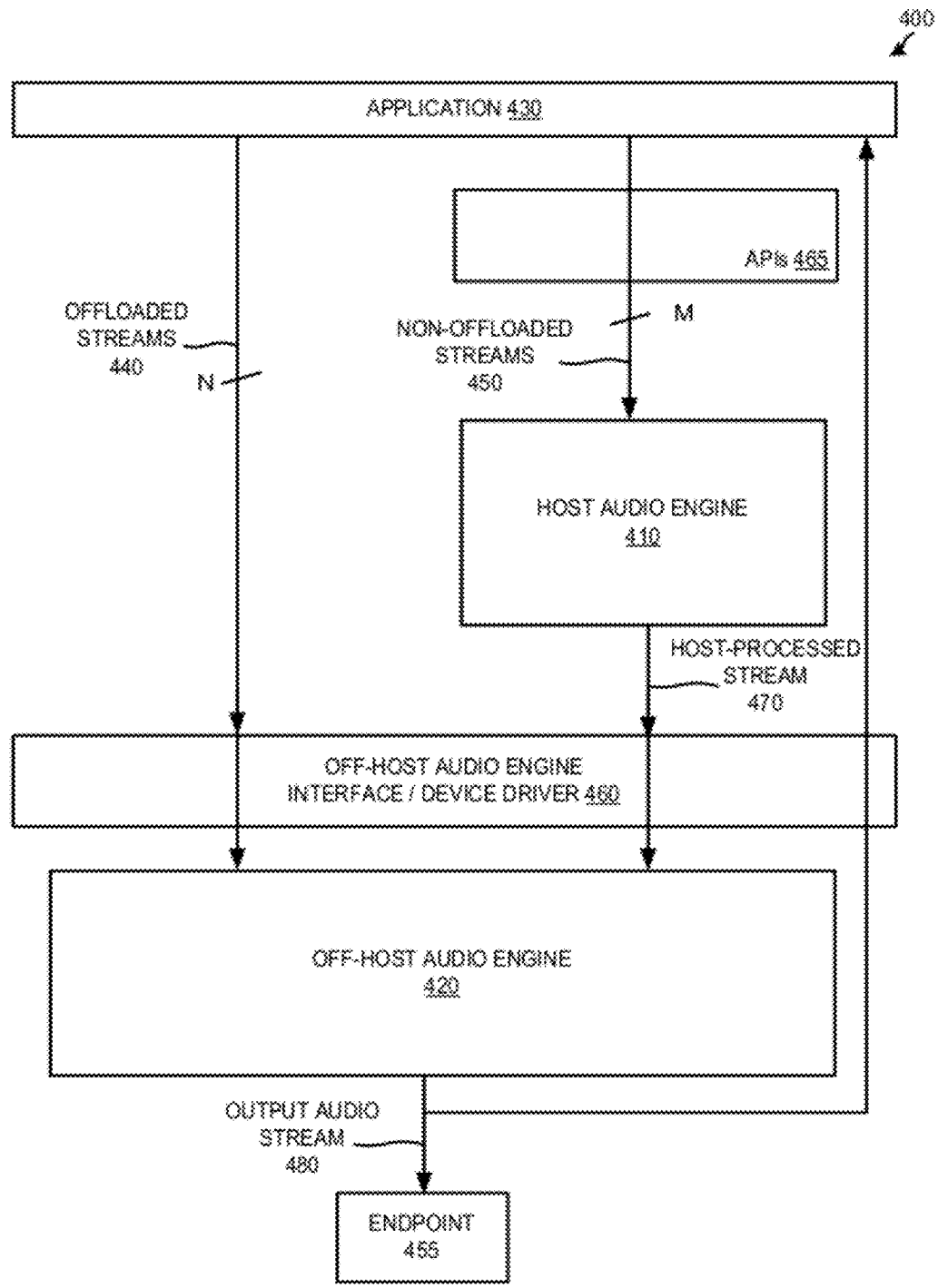
FIG. 4 is a block diagram of an exemplary audio processing system comprising a host audio engine and an off-host audio engine.

FIG. 4 is a block diagram of an exemplary audio processing system 400 comprising a host audio engine 410 and an off-host audio engine 420. An application 430 can utilize the combined audio processing capabilities of the off-host and host audio engines 410 and 420 to increase audio processing performance relative to utilizing only the host audio engine 410. The application 430 produces N offloaded audio streams 440 and M non-offloaded audio streams 450 for processing and eventual delivery to an endpoint 455. The application 430 interfaces with the off-host audio engine 420 via an off-host audio engine interface (device driver) 460 and with the host audio engine 410 via one or more APIs 465. Upper-level APIs (not shown) can exist between the application 430 and the interface 460. The off-host audio engine interface 460 sends the offloaded audio streams 440 to the off-host audio engine 420 and the APIs 465 send the non-offloaded audio streams 450 to the host audio engine 410. As used herein, the term "offloading" refers to delivering an audio stream to an off-host audio engine for audio processing. That is, offloaded audio streams bypass, and thus do not undergo audio processing by, the host audio engine. The host audio engine 410 processes the non-offloaded audio streams 450 to produce a host-processed audio stream 470, which is delivered to the off-host audio engine 420 via the interface 460 for mixing and further processing. The off-host audio engine generates an output audio stream 480 that is delivered to the endpoint 455 and provided to the off-host engine interface 460 that in turns passes the output stream to the application 430 to be used as a reference stream. The host audio engine 410, the application 430 and the APIs 465 can be part of a host.

The audio processing capabilities of the system 400 are greater than that of the system 300 for at least two reasons. First, the system 400 comprises two audio engines, the host audio engine 410 and the off-host audio engine 420. Second, in embodiments where the host audio engines 310 and 410 are software audio engines and the off-host audio engine 420 is a hardware audio engine, the off-host audio engine 420 generally has greater audio processing performance than that of host audio engines 310 and 410.

In some embodiments, an application 430 first looks to offload audio streams to the off-host audio engine 420 before sending the audio stream to the host audio engine 410 for processing, in order to take advantage of the off-host engine's greater processing capabilities. As long as the off-host audio engine 420 can handle processing an additional audio stream, the application 430 can route newly opened audio streams to the off-host engine 420. In other embodiments, the application 430 can decide to which audio engine to send an audio stream based on the audio processing to be performed or characteristics of the audio stream itself. For example, audio streams slated to undergo a greater amount of audio processing (e.g., multiple local effects and global effects are to be applied to the stream) or audio processing that is computationally expensive can be routed to the off-host audio engine 420. Audio streams to undergo simpler audio processing, for example, only volume adjustment, can be sent to the host audio engine 410. Further, more complex audio streams or audio streams streaming at a high bit rate could be selected for being offloaded to the off-host audio engine.

The off-host audio engine interface 460 is configured to receive one or more offloaded audio streams from an application or upper-level API and a host-processed audio stream from a host audio engine. The interface 460 is configured to pass these streams to the off-host audio engine 420 for processing. The interface 460 is further configured to receive a reference stream from the off-host audio engine, which is based on a mix of the host-processed stream 470 and offloaded audio streams that have processed by the off-host audio engine. Further details of the off-host audio engine interface 460 will be discussed below.

In some embodiments, one of the non-offloaded streams 450 can be sent directly to the off-host audio engine 420. Thus, the off-host audio engine 420 can provide output audio streams based on a mix of a non-offloaded streams 450 and offloaded streams 440 processed by the off-host audio engine 420.

Figure 5:
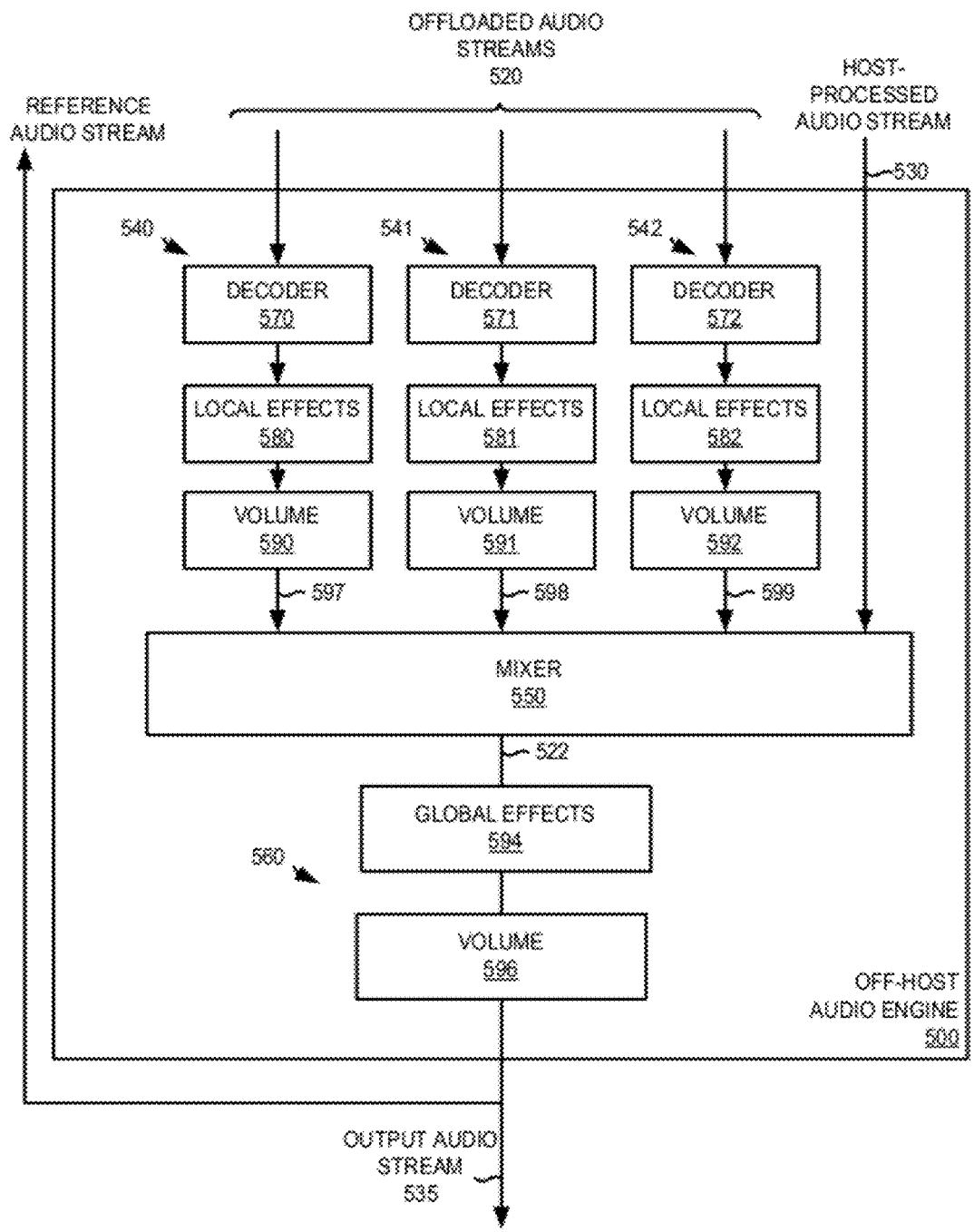
FIG. 5 is a block diagram of an exemplary off-host processing engine.

FIG. 5 is a block diagram of an exemplary off-host processing engine 500. The topology of the off-host engine 500 is similar to that of the host audio engines described herein. The off-host engine 510 is configured to receive one or more offloaded audio streams 520 and a host-processed audio stream 530, and to generate an output audio stream 535 that can be provided to an endpoint or as a reference stream to an application. The offloaded audio streams 520 and the host-processed audio stream 530 can be provided by an off-host audio engine interface.

In some embodiments, the off-host audio engine 510 can receive more than one host-processed audio stream. For example, an audio processing system can comprise multiple hosts in which each host has a host audio engine capable of generating a host-processed audio stream. Multi-host systems include single computing devices comprising multiple hosts in communication with an off-host audio engine, or multiple computing devices in communication with a common external off-host audio engine. An off-host audio engine in such multi-host systems can receive multiple host-processed streams and mix offloaded audio streams received from any of the hosts. Further, although the host-processed stream 530 is intended to be an audio stream that has been processed by a host audio engine, the stream 530 can any audio stream. For example, the stream 530 can be an audio stream that has not been processed by a host audio engine.

The off-host audio engine 500 comprises local audio pipelines 540-542 that perform audio processing on the individual offloaded streams 520, a mixer 550 and a global audio processing pipeline 560. The local audio processing pipelines 540-542 comprise decoder 570-572, local effects 580-582 and volume 590-592 components. Global audio processing pipeline 560 comprises global effect 594 and volume 596 components. The decoder, local and global effects, and volume components have the capabilities described above in regards to the components of host audio engine 310. The local audio processing pipelines 540-542 process the offloaded audio streams 520 to generate off-host-processed audio streams 597-599. The mixer 550 mixes the off-host-processed audio streams 597-599 with the host-processed audio stream 530 to generate a mixed stream 522. The global audio processing pipeline 560 processes the mixed audio stream 522 to generate the output audio stream 535.

The configuration of the off-host engine can be varied in manners similar to that discussed above with regards to the host audio engine. For example, the local and global pipelines 540-542 and 560 can include more or fewer components than those shown in FIG. 5. Further, the mixed stream 522 or any other intermediate stream in the global audio pipeline 560 can be provided as the reference stream.

Figure 6:
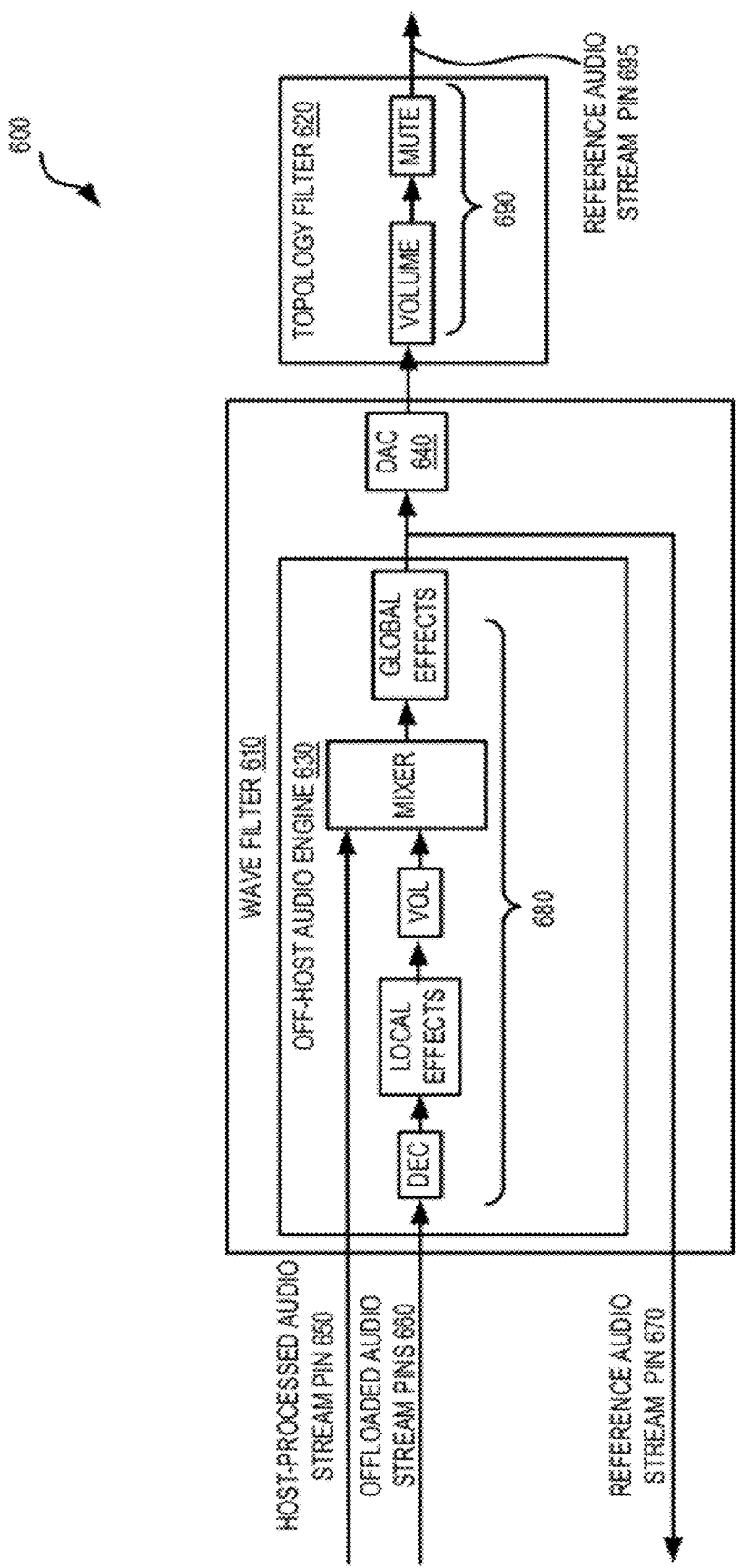
FIG. 6 is a block diagram of an exemplary kernel filter topology.

FIG. 6 is a block diagram an exemplary kernel filter topology 600 exposed by an audio device driver to express support for an off-host audio engine in a Windows® operating system environment. The topology 600 can be used in Windows® versions that support Windows® Driver Model (WDM) audio drivers. The kernel filter topology 600 comprises a wave filter 610 and a topology filter 620. Wave filters represent hardware devices that render and/or capture wave-formatted (.wav) digital audio data. Generally, a wave-rendering filter receives a wave-formatted digital audio stream as input and outputs either an analog or a digital audio stream processed by audio processing components within the filter. A topology filter represents hardware that handles interactions among the various streams that are managed by audio processing hardware. The topology filter represents hardware that performs mixing and rendering of mixed streams.

In the kernel filter topology 600, the wave filter 610 comprises a representation of an off-host audio engine 630 as a node in the wave filter 610 and a digital to analog converter (DAC) 640. The wave filter kernel filter topology 600 comprises a host-processed audio stream input pin 650, multiple offloaded audio stream input pins 660 a reference (or loopback) audio stream output pin 670 and an output audio stream pin 695. It is understood that in the context of a device driver, a pin represents an input or output connection point through which data enters or exits a filter. The audio processing components 680 and 690 in the wave filter 610 and topology filter 620 correspond to audio processing components of an off-host audio engine. Although the kernel filter topology 600 comprises separate wave and topology filters, the two filters can be combined into a single filter. In some embodiments, the output audio stream pin 695 and the reference audio stream pin 670 can be combined as a single output pin.

Although the kernel topology 600 is discussed with reference to a device driver for use with the Windows® operating system, audio drivers exposing the capabilities of off-host audio engines can be provided for use with any operating system. Device drivers used for exposing the capabilities of off-host audio engines as described herein comprise one or more host-processed audio stream input pins, one or more offloaded audio stream input pins, a reference or loopback audio stream output pin, and an output steam pin. As described, the off-host audio engine interface provides a flexible, standardized, flexible and simple architecture to which most off-host audio engine hardware can map.

Audio device driver embodiments exposing off-host audio engine for use in Windows® operating systems can conform to one or more of the specifications described in the following paragraphs. The specifications refer to pin factories. Pin factories in Windows® Driver Model audio models describe the pins that a filter can instantiate. For example, an offloaded audio stream pin factory describes the offloaded audio stream input pins that a filter can generate.

Audio Engine KS (Lernel-Mode Filter) Node

Audio device drivers expose off-host audio engine capabilities as a node in the wave filter topology. The KSNODE_DESCRIPTOR for this node can contain a type GUID (globally unique identifier) that is set to KSNODETYPE_AUDIO_ENGINE. Table 1 contains an example of the KSNODE_DESCRIPTOR for this node.

TABLE 1

```
typedef struct _KSNODE_DESCRIPTOR {
    const KSAUTOMATION_TABLE *AutomationTable;
    ← driver specific
    const GUID *Type; ← set to KSNODETYPE_AUDIO_ENGINE
    const GUID *Name; ← driver specific (may be
    KSNODETYPE_AUDIO_ENGINE)
} KSNODE_DESCRIPTOR, *PKSNODE_DESCRIPTOR;
```

If the name GUID is set to KSNODETYPE_AUDIO_ENGINE, then a default name string can be used for this node. The default string can be added to ks.inf to populate the HKEY_LOCAL_MACHINE\SYSTEM\CurrentControlSet\Control\MediaCategories registry key with the default name. The definition of the new node type GUID, KSNODETYPE_AUDIO_ENGINE can be as shown in Table 2.

TABLE 2

```
#define STATIC_KSNODETYPE_AUDIO_ENGINE\
    0x35caf6e4, 0xf3b3, 0x4168, 0xbb, 0x4b, 0x55, 0xe7, 0x7a, 0x46,
0x1c, 0x7e
DEFINE_GUIDSTRUCT("35CAF6E4-F3B3-4168-BB4B-
55E77A461C7E",
KSNODETYPE_AUDIO_ENGINE);
#define KSNODETYPE_AUDIO_ENGINE
DEFINE_GUIDNAMED(KSNODETYPE_AUDIO_ENGINE)
```

Audio Engine KS Property Set

The Audio Engine KS node representing the off-host audio engine can support KSPROPSETID_AudioEngine properties, which can be defined as in Table 3.

TABLE 3

```
#define STATIC_KSPROPSETID_AudioEngine\
    0x3A2F82DCL, 0x886F, 0x4BAA, 0x9E, 0xB4, 0x8, 0x2B, 0x90,
0x25, 0xC5, 0x36
DEFINE_GUIDSTRUCT("3A2F82DC-886F-4BAA-9EB4-
082B9025C536", KSPROPSETID_AudioEngine);
#define KSPROPSETID_AudioEngine
DEFINE_GUIDNAMED(KSPROPSETID_AudioEngine)
```

Audio Engine KS Properties

The properties contained in the KSPROPSETID_AUDIOENGINE property set can be defined as in Table 4 and supported by a KSNODETYPE_AUDIO_ENGINE node.

TABLE 4

```
typedef enum {
    KSPROPERTY_AUDIOENGINE_LFX_ENABLE,
    KSPROPERTY_AUDIOENGINE_GFX_ENABLE,
    KSPROPERTY_AUDIOENGINE_MIXFORMAT,
    KSPROPERTY_AUDIOENGINE_PROCESSINGPERIOD,
    KSPROPERTY_AUDIOENGINE_DEVICEFORMAT,
    KSPROPERTY_AUDIOENGINE_SUPPORTEDDEVICEFORMATS,
```

TABLE 4-continued

```
    KSPROPERTY_AUDIOENGINE_DESCRIPTOR,
    KSPROPERTY_AUDIOENGINE_BUFFER_SIZE_RANGE,
    KSPROPERTY_AUDIOENGINE_LOOPBACK_PROTECTION
} KSPROPERTY_AUDIOENGINE;
```

In addition to the properties in KSPROPSETID_AUDIOENGINE, a KSNODETYPE_Audio_Engine node can support the following properties in KSPROPSETID_Audio: KSPROPERTY_AUDIO_PEAKMETER, KSPROPERTY_AUDIO_VOLUMELEVEL, KSPROPERTY_AUDIO_MUTE, KSPROPERTY_AUDIO_PRESENTATION_POSITION, KSPROPERTY_AUDIO_WAVERT_CURRENT_WRITE_POSITION and KSPROPERTY_AUDIO_LINEAR_BUFFER_POSITION.

To target a specific pin instance with a property request, the KS Node Property request can be sent to a pin instance rather than a filter instance. This causes the PCPROPERTYREQUEST structure's MinorTarget to be a pointer to the stream object representing that pin instance.

For kernel stream properties that target specific channels, a mechanism of supplying a KSNODEPROPERTY_AUDIO_CHANNEL structure is needed. Tables 5-15 describe various KSPROPERTY_AUDIOENGINE properties. The "Get" and "Set" columns in the following tables indicate whether a property can be retrieved by or set by an application or upper-level API, respectively.

TABLE 5

| KSPROPERTY_AUDIOENGINE_LFX_ENABLE | | | | |
|---|---|---|---|---|
| Get | Set | Target | Property Descriptor Type | Property Value Type |
| Yes | Yes | Off-host audio engine node via pin instance | KSP_NODE | BOOL |

The property value of KSPROPERTY_AUDIOENGINE_LFX_ENABLE is of type BOOL (Boolean) and can indicate whether local audio effect processing on a specified stream is enabled. A value of TRUE indicates that local effect processing is enabled. A value of FALSE indicates that local effect processing is disabled.

TABLE 6

| KSPROPERTY_AUDIOENGINE_GFX_ENABLE | | | | |
|---|---|---|---|---|
| Get | Set | Target | Property Descriptor Type | Property Value Type |
| Yes | Yes | Off-host audio engine node via filter | KSP_NODE | BOOL |

The property value of KSPROPERTY_AUDIOENGINE_GFX_ENABLE is of type BOOL and can indicate whether global audio effect processing in the off-host audio engine node is enabled. A value of TRUE indicates that global effect processing is enabled. A value of FALSE indicates that global effect processing is disabled.

TABLE 7

KSPROPERTY_AUDIOENGINE_MIXFORMAT

| Get | Set | Target | Property Descriptor Type | Property Value Type |
|---|---|---|---|---|
| Yes | No | Off-host audio engine node via filter | KSP_NODE | KSDATAFORMAT |

The property value of KSPROPERTY_AUDIOENGINE_MIXFORMAT is of type KSDATAFORMAT and can indicate the mix format set on the mixer in the off-host audio engine node. The mix format set on the off-host audio engine node at any point in time can be supported by the offloaded audio stream pin factory.

TABLE 8

KSPROPERTY_AUDIOENGINE_PROCESSINGPERIOD

| Get | Set | Target | Property Descriptor Type | Property Value Type |
|---|---|---|---|---|
| Yes | Yes | Off-host audio engine node via filter | KSP_NODE | LONGLONG |

The property value of KSPROPERTY_AUDIOENGINE_PROCESSINGPERIOD is of type LONGLONG and can indicate the off-host audio engine's processing period in 100 ns units.

TABLE 9

KSPROPERTY_AUDIOENGINE_DEVICEFORMAT

| Get | Set | Target | Property Descriptor Type | Property Value Type |
|---|---|---|---|---|
| Yes | Yes | Off-host audio engine node via filter | KSP_NODE | KSDATAFORMAT |

The property value of KSPROPERTY_AUDIOENGINE_DEVICEFORMAT is of type KSDATAFORMAT and can indicate the device format set on the output of the audio engine node. The off-host audio engine can generate an output audio stream that conforms to the set device format.

TABLE 10

KSPROPERTY_AUDIOENGINE_SUPPORTEDDEVICEFORMATS

| Get | Set | Target | Property Descriptor Type | Property Value Type |
|---|---|---|---|---|
| Yes | No | Off-host audio engine node via filter | KSP_NODE | KSDATAFORMAT |

The property value of KSPROPERTY_AUDIOENGINE_SUPPORTEDDEVICEFORMATS is of type KSDATAFORMAT and can indicate the supported format on the output of the audio engine node. Multiple formats can be specified in a KSMULTIPLE_ITEM structure.

TABLE 11

KSPROPERTY_AUDIOENGINE_DESCRIPTOR

| Get | Set | Target | Property Descriptor Type | Property Value Type |
|---|---|---|---|---|
| Yes | No | Off-host audio engine node via filter | KSP_NODE | KSAUDIOENGINE_DESCRIPTOR |

The property value of KSPROPERTY_AUDIOENGINE_DESCRIPTOR is of type KSAUDIOENGINE_DESCRIPTOR and can indicate the static properties of the off-host audio engine node. The KSAUDIOENGINE_DESCRIPTOR structure is defined in Table 12.

TABLE 12

```
typedef struct _tagKSAUDIOENGINE_DESCRIPTOR
{
    UINT nHostPinId;
    UINT nOffloadPinId;
    UINT nLoopbackPinId;
} KSAUDIOENGINE_DESCRIPTOR,
*PKSAUDIOENGINE_DESCRIPTOR;
```

The KSAUDIOENGINE_DESCRIPTOR fields can include the following fields:

nHostPinId—The ID of the pin factory connected to the off-host audio engine node that is intended to receive host-processed audio data. This is the pin factory on which a host audio engine can run.

nOffloadPinId—The ID of the pin factory connected to the off-host audio engine node that is intended for processing offloaded audio streams.

nLoopbackPinId—The ID of the pin factory connected to the off-host audio engine that is intended for supplying a post-mix loopback or reference stream.

TABLE 13

KSPROPERTY_AUDIOENGINE_BUFFER_SIZE_RANGE

| Get | Set | Target | Property Descriptor Type | Property Value Type |
|---|---|---|---|---|
| Yes | No | Off-host audio engine node via pin instance | KSP_NODE | KSAUDIOENGINE_BUFFER_SIZE_RANGE |

The KSAUDIOENGINE_BUFFER_SIZE_RANGE and related KSDATAFORMAT_WAVEFORMATEX structures can be defined as shown in Table 14.

TABLE 14

KSAUDIOENGINE_BUFFER_SIZE_RANGE and KSDATAFORMAT_WAVEFORMATEX structures

```
typedef struct {
    KSDATAFORMAT    DataFormat;
    WAVEFORMATEX    WaveFormatEx;
} KSDATAFORMAT_WAVEFORMATEX,
*PKSDATAFORMAT_WAVEFORMATEX;
typedef struct _tagKSAUDIOENGINE_BUFFER_SIZE_RANGE
{
    ULONG MinBufferBytes;
    ULONG MaxBufferBytes;
} KSAUDIOENGINE_BUFFER_SIZE_RANGE,
*PKSAUDIOENGINE_BUFFER_SIZE_RANGE;
```

The KSPROPERTY_AUDIOENGINE_BUFFER_SIZE_RANGE supports KSPROPERTY_TYPE_GET. This function allows the off-host audio engine device driver to provide information about the minimum and maximum buffer sizes supported for a given data format. The KSPROPERTY_AUDIOENGINE_BUFFER_SIZE_RANGE property can be specified using KSP_NODE, where the member specifies the relevant off-host audio engine node.

The KSPROPERTY_AUDIOENGINE_BUFFER_SIZE_RANGE structure can include a structure of type KSDATAFORMAT_WAVEFORMATEX that specifies the data format for which a request is being made. Upon success, the KS filter returns STATUS_SUCCESS and fills in the MinBufferBytes and MaxBufferBytes fields of the KSAUDIOENGINE_BUFFER_SIZERANGE structure.

The MaxBufferBytes field can specify the maximum available buffer size, in bytes, that an off-host audio engine can support. The MaxBufferBytes field can account for capabilities and availability of a DMA (Direct Memory Access) engine and internal DSP buffers. The MinBufferBytes field can specify the minimum buffer size, in bytes, that an off-host audio engine can support without causing frequent audio glitching. An audio stack (i.e., a Windows® audio stack) can use information retrieved from the KSAUDIOENGINE_BUFFER_SIZE_RANGE property to determine, for example, how to best determine the buffer size to allocate to achieve low power playback or low latency playback.

TABLE 15

KSPROPERTY_AUDIOENGINE_LOOPBACK_PROTECTION

| Get | Set | Target | Property Descriptor Type | Property Value Type |
|---|---|---|---|---|
| No | Yes | Off-host audio engine node via pin instance | KSP_NODE | ULONG |

Tables 16-21 describe various KSPROPERTY_AUDIO properties.

TABLE 16

KSPROPERTY_AUDIO_PEAKMETER

| Get | Set | Target | Property Descriptor Type | Property Value Type |
|---|---|---|---|---|
| Yes | No | Off-host audio engine node via filter or pin instance | KSP_NODEPROPERTY_AUDIO_CHANNEL | LONG |

The property value of KSPROPERTY_AUDIO_PEAKMETER is of type LONG and can specify the peak sample value of the specified stream and channel. If the peak value is negative, its absolute value is used.

TABLE 17

KSPROPERTY_AUDIO_VOLUMELEVEL

| Get | Set | Target | Property Descriptor Type | Property Value Type |
|---|---|---|---|---|
| Yes | Yes | Off-host audio engine node via filter or pin instance | KSP_NODEPROPERTY_AUDIO_CHANNEL | LONG |

The property value of KSPROPERTY_AUDIO_VOLUMELEVEL is of type LONG and specifies the volume level of a given channel on a given audio stream. A decibel range can be represented by integer values −2147483648 to +2147483647, and can have a resolution of 1/65,536 decibel. Volume-level values can use the following scale: −2147483648 is −infinity decibels (attenuation), −2147483647 is −32767.99998474 decibels (attenuation) and +2147483647 is +32767.99998474 decibels (gain). Other scales can be used. If a volume value is specified that is beyond the range of the filter, the filter can complete a request to set this property, and can return the actual volume value used in subsequent calls to get this property.

TABLE 18

| | | | | Property Value |
|---|---|---|---|---|
| Get | Set | Target | Property Descriptor Type | Type |
| Yes | Yes | Off-host audio engine node via filter or pin instance | KSP_NODEPROPERTY_AUDIO_CHANNEL | BOOL |

KSPROPERTY_AUDIO_MUTE

The property value of KSPROPERTY_AUDIO_MUTE is of type BOOL and can indicate whether the channel of a given stream is muted. A value of TRUE indicates that the channel is muted. A value of FALSE indicates that the channel is not muted.

TABLE 19

KSPROPERTY_AUDIO_PRESENTATION_POSITION

| Get | Set | Target | Property Descriptor Type | Property Value Type |
|---|---|---|---|---|
| Yes | No | Off-host audio engine node via pin instance | KSP_NODE | KSAUDIO_PRESENTATION_POSITION |

The KSAUDIO_PRESENTATION_POSITION structure can be defined as shown in Table 20.

TABLE 20

KSAUDIO_PRESENTATION_POSITION structure

```
typedef struct
{
    UINT64 u64PositionInBlocks;
    LARGE_INTEGER u64QPCPosition;
} KSAUDIO_PRESENTATION_POSITION,
 *PKSAUDIO_PRESENTATION_POSITION;
```

The u64PositionInBlocks can represent the block offset from the start of an audio stream to a current post-decoded uncompressed position in the stream. In this context, a block refers to a group of channels in the same sample. For a PCM stream, a block is the same as a frame. For compressed audio formats, a block is a single sample within a frame. For example, for an audio stream encoded in MP3 format, each MP3 frame has 1152 samples, or 1152 blocks.

The u64QPCPosition field can represent the value of a performance counter at the time that the audio endpoint device reads the device position in response to a KSAUDIO_PRESENTATION_POSITION call. An off-host engine interface driver can write to this field with a value read from calling KeQueryPerformanceCounter when the presentation position is snapped.

TABLE 21

KSPROPERTY_AUDIO_WAVERT_CURRENT_WRITE_POSITION

| Get | Set | Target | Property Descriptor Type | Property Value Type |
|---|---|---|---|---|
| No | Yes | Off-host audio engine node via pin instance | KSP_NODE | ULONG |

The KSPROPERTY_AUDIO_WAVERT_CURRENT_WRITE_POSITION property value can specify the current write position of a WaveRT buffer, which an off-host engine device driver can use to determine the quantity of valid data residing in the WaveRT buffer.

TABLE 22

KSPROPERTY_AUDIO_LINEAR_BUFFER_POSITION

| Get | Set | Target | Property Descriptor Type | Property Value Type |
|---|---|---|---|---|
| Yes | No | Off-host audio engine node via pin instance | KSP_NODE | ULONGLONG |

The KSPROPERTY_AUDIO_LINEAR_BUFFER_POSITION property value can represent the number of bytes that a DMA has fetched from an audio buffer since the beginning of the stream.

Figure 7:
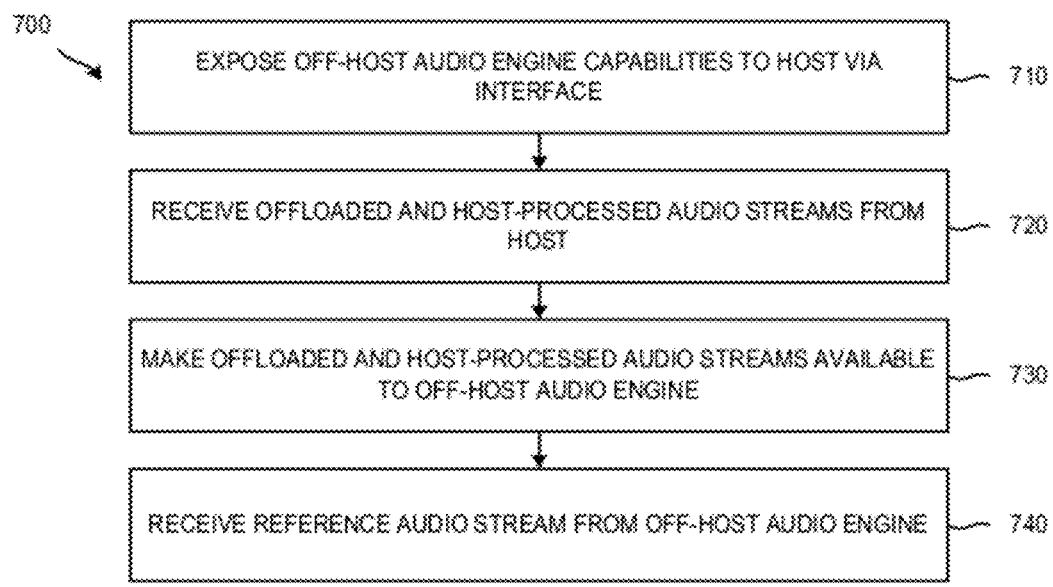
FIG. 7 is a flowchart of an exemplary method of off-host audio processing.

FIG. 7 is a flowchart of an exemplary method 700 of off-host audio processing. The method 700 can be performed by, for example, the combination of a digital signal processor (DSP) located in the same computing device as a host CPU running an audio processing application and a DSP device driver. At 710, an off-host audio engine interface exposes capabilities of an off-host audio engine to a host. In the example, the DSP device driver exposes the audio processing capabilities of the DSP to the audio application running on the host CPU. At 720, one or more offloaded audio streams and a host-processed audio stream are received at the off-host audio engine interface from the host. In the example, the device driver receives audio streams offloaded by the application and an audio stream that has undergone audio processing by the audio application. At 730, the off-host audio interface makes the offloaded audio streams and the host-processed audio stream available to the off-host audio engine. In the example, the DSP device driver makes the offloaded audio streams and the application-processed audio stream available to the DSP. At 740, the off-host audio engine interface receives a reference audio stream from the off-host audio engine. The reference stream is based on a mixed audio stream comprising the host-processed audio stream mixed with one or more off-host-processed audio streams. The one or more processed offloaded audio streams are the offloaded audio streams processed by the off-host audio engine. In the example, the DSP device driver receives a reference audio stream from the DSP. The reference stream received from the DSP is based on the application-processed audio stream mixed with offloaded audio streams that have been processing by the DSP.

The method 700 can further comprise one or more of the following: the off-host audio engine interface providing the reference stream to the host, and the host controlling local or global audio processing of the offloaded streams. The host can control local processing of the offloaded streams by, for example, enabling or disabling local processing for at least one of the offloaded audio streams, or by enabling or disabling local audio processing components via the off-host audio engine interface. The host can control global processing of the mixed audio stream by, for example, enabling or disabling global processing of the mixed audio stream, or by enabling or disabling global audio components via the off-host audio engine interface. Continuing with the example, the audio application can control local processing by, for example, disabling local audio processing for a first offloaded audio stream, disabling a local effects component for a second offloaded audio stream and disabling the volume control component for the mixed audio stream.

Figure 8:
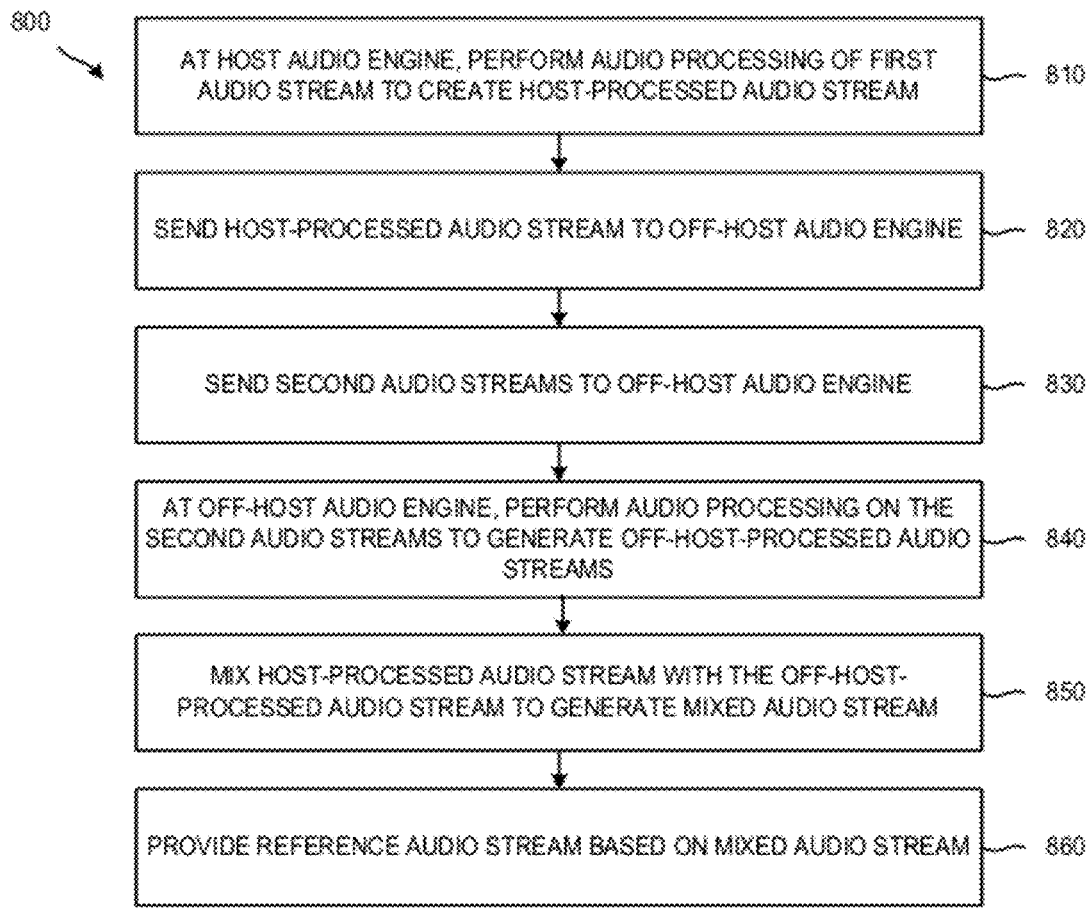
FIG. 8 is a flowchart of an exemplary method of processing audio streams.

FIG. 8 is a flowchart of an exemplary method 800 of processing audio streams. The method 800 can be performed by, for example, a desktop computer comprising a DSP and executing an audio application on a host CPU. At 810, audio processing on a first audio stream is performed at a host audio engine to create a host-processed audio stream. In the example, the audio application performs audio processing on a first audio stream to generate an application-processed audio stream. At 820, the host-processed audio stream is sent to an off-host audio engine. In the example, the audio application sends the application-processed audio stream to the off-host audio engine. At 830, one or more second audio streams are sent to the off-host audio engine. The one or more second audio streams have not undergone audio processing by the host audio engine. In the example, the audio application offloads three audio streams to the DSP. At 840, audio processing is performed on the one or more second audio streams at the off-host audio engine to generate one or more off-host-processed audio streams. In the example, the DSP performs audio processing on each of the three offloaded audio streams to produce three DSP-processed audio streams. At 850, the one or more host-processed audio streams are mixed at the off-host audio engine with the off-host-processed audio stream to generate a mixed audio stream. In the example, the DSP mixes the three DSP-processed audio streams with the application-processed audio stream to produce a mixed audio stream. At 860, the off-host audio engine provides a reference audio stream based on the mixed audio stream. In the example, the DSP provides a reference audio stream based on the mixed audio stream.

The method 800 can further comprise determining to send at least one of the second audio streams to the off-host audio engine based at least in part on a characteristic of the at least one second audio stream, or the audio processing to be performed on the one or more second audio streams. In the example, the audio application sends an audio stream to the DSP due to the bitrate of the audio stream. The audio application can send a second audio stream to the DSP due to the amount of audio processing to be performed on the second audio stream.

Although described with application to the processing of audio data, the techniques and tools described herein can be applied to the processing of media in general. For example, an off-host multimedia engine can process offloaded multimedia streams that are processed by local multimedia processing pipelines, and mixed with a host-processed multimedia stream. The resulting mixed multimedia stream can be processed by a global multimedia processing pipeline to generate an output multimedia stream, which can be provided as a reference multimedia stream. The local and global multimedia processing pipelines can comprise graphics and audio/video processing components in addition to or in place of the audio processing components described herein.

Any of the computer-executable instructions for implementing the disclosed techniques as well as any data created and used during implementation of the disclosed embodiments can be stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other computing devices that include computing hardware). Computer-readable storage media excludes propagated signals. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods, apparatuses and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatuses can be used in conjunction with other systems, methods and apparatuses.

Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Having illustrated and described the principles of the illustrated embodiments, the embodiments can be modified in various arrangements while still remaining faithful to the concepts described above. In view of the many possible embodiments to which the principles of the disclosed invention can be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. One or more computer-readable storage media storing instructions that, when executed by a computing device, perform a method of off-host audio processing, the method comprising:
    receiving at an off-host audio engine interface that exposes capabilities of an off-host audio engine to a host, one or more offloaded audio streams and a host-processed audio stream that has already been processed by the host;
    making by the off-host audio engine interface, the one or more offloaded audio streams and the host-processed audio stream available to the off-host audio engine; and
    generating by the off-host audio engine, an output audio stream based on a mixed audio stream, the mixed audio stream comprising the host-processed audio stream mixed with one or more off-host-processed audio streams, the one or more off-host-processed audio streams comprising the one or more offloaded audio streams processed by the off-host audio engine; and
    providing by the off-host audio engine, the output audio stream to an endpoint for consumption and to the off-host audio engine interface as a reference audio stream,
    wherein a configuration of the off-host audio engine enables the host to offload audio streams to the off-host audio engine for processing instead of processing the offloaded audio streams using a host audio engine.

2. The computer-readable storage media of claim 1, wherein the method further comprises providing by the off-host audio engine interface, the reference audio stream to the host.

3. The computer-readable storage media of claim 1, wherein the host-processed audio stream has been processed by a software host audio engine.

4. The computer-readable storage media of claim 1, wherein the off-host audio engine is a hardware audio engine.

5. The computer-readable storage media of claim 1, wherein the host controls audio processing of the one or more offloaded audio streams by the off-host audio engine.

6. The computer-readable storage media of claim 5, wherein the off-host audio engine is capable of performing local audio processing on the one or more offloaded audio streams, and wherein the host controls audio processing of the one or more offloaded audio streams by enabling or disabling local audio processing for at least one of the one or more offloaded audio streams via the off-host audio engine interface.

7. The computer-readable storage media of claim 5, wherein the off-host audio engine comprises one or more local audio processing components, and wherein the host controls local audio processing of the one or more offloaded audio streams by enabling or disabling at least one of the one or more local audio processing components via the off-host audio engine interface.

8. The computer-readable storage media of claim 1, wherein the host controls audio processing of the mixed audio stream by the off-host audio engine.

9. The computer-readable storage media of claim 8, wherein the off-host audio engine is capable of performing global audio processing on the mixed audio stream, and wherein the host controls audio processing of the mixed audio stream by enabling or disabling global audio processing via the off-host audio engine interface.

10. The computer-readable storage media of claim 8, wherein the off-host audio engine comprises one or more global audio processing components, and wherein the host controls audio processing by enabling or disabling at least one of the one or more global audio processing components via the off-host audio engine interface.

11. An audio processing system, comprising:
    a host audio engine configured to perform audio processing on one or more first audio streams to generate a host-processed audio stream; and
    an off-host audio engine configured to:
        perform audio processing on one or more offloaded audio streams to generate one or more off-host-processed offloaded audio streams;
        mix the one or more off-host-processed offloaded audio streams with the host-processed audio stream to generate a mixed audio stream;
        generate an output audio stream for consumption by at least one endpoint, the generating based on the mixed audio stream; and
        provide the output audio stream:
            to the at least one endpoint for consumption; and
            to at least one audio-processing application as a reference audio stream, the audio-processing application generating the one or more first audio streams based at least in part on the reference audio stream.

12. The system of claim 11, wherein the host audio engine is located in a first computing device and the off-host audio engine is located in a second computing device.

13. The system of claim 11, wherein the host audio engine and the off-host audio engine are located in a computing device.

14. The system of claim 11, wherein the audio processing system is operable to, for each of the one or more offloaded audio streams, decode the offloaded audio stream, process the offloaded audio stream to create one or more audio effects, or adjusting the volume of the audio signal represented by the offloaded audio stream.

15. The system of claim 11, wherein the audio processing system is operable to, perform audio processing on the mixed audio stream to create the reference audio stream, the performing audio processing on the mixed audio stream comprising one or more of the following: process the mixed audio stream to create one or more global audio effects or adjust a volume of an audio signal represented by the mixed audio stream.

16. The system of claim 11, further comprising a host comprising the host audio engine, the host being configured to:
provide the one or more offloaded audio streams to the off-host audio engine;
provide the one or more first audio streams to the host audio engine; and
receive the reference audio stream from the off-host audio engine.

17. A method of processing audio streams, the method comprising:
at a host audio engine, performing audio processing on a first audio stream to create a host-processed audio stream;
sending the host-processed audio stream to an off-host audio engine;
sending one or more second audio streams to the off-host audio engine, the one or more second audio streams not having undergone audio processing by the host audio engine; and
at the off-host audio engine:
performing audio processing on the one or more second audio streams to generate one or more off-host-processed audio streams;
mixing the host-processed audio stream with the one or more off-host-processed audio streams to generate a mixed audio stream;
generating an output audio stream for consumption by at least one endpoint, the generating based on the mixed audio stream; and
providing the output audio stream to the at least one endpoint for consumption, and as a reference audio stream to at least one audio processing application, the audio processing application generating at least the first audio stream.

18. The method of claim 17 wherein the performing audio processing on the one or more second audio streams comprises performing, for each of the one or more second audio streams, at least one of the following: decoding the second audio stream, processing the second audio stream to create one or more local audio effects, or adjusting a volume of an audio signal represented by the second audio stream.

19. The method of claim 17 further comprising performing audio processing on the mixed audio stream to generate the reference audio stream, the audio processing on the mixed audio stream comprising at least one of the following: processing the mixed audio stream to create one or more global audio effects or adjusting a volume of an audio signal represented by the mixed audio stream.

20. The method of claim 17, further comprising determining to send one of the one or more second audio streams to the off-host audio engine based at least in part on a characteristic of the one or more second audio streams or the audio processing to be performed on the one of the one or more second audio streams.

* * * * *